March 8, 1960     T. CARRIGAN     2,927,760
CLAMP FOR MOUNTING WHEEL BALANCERS
Filed May 18, 1956     2 Sheets-Sheet 1
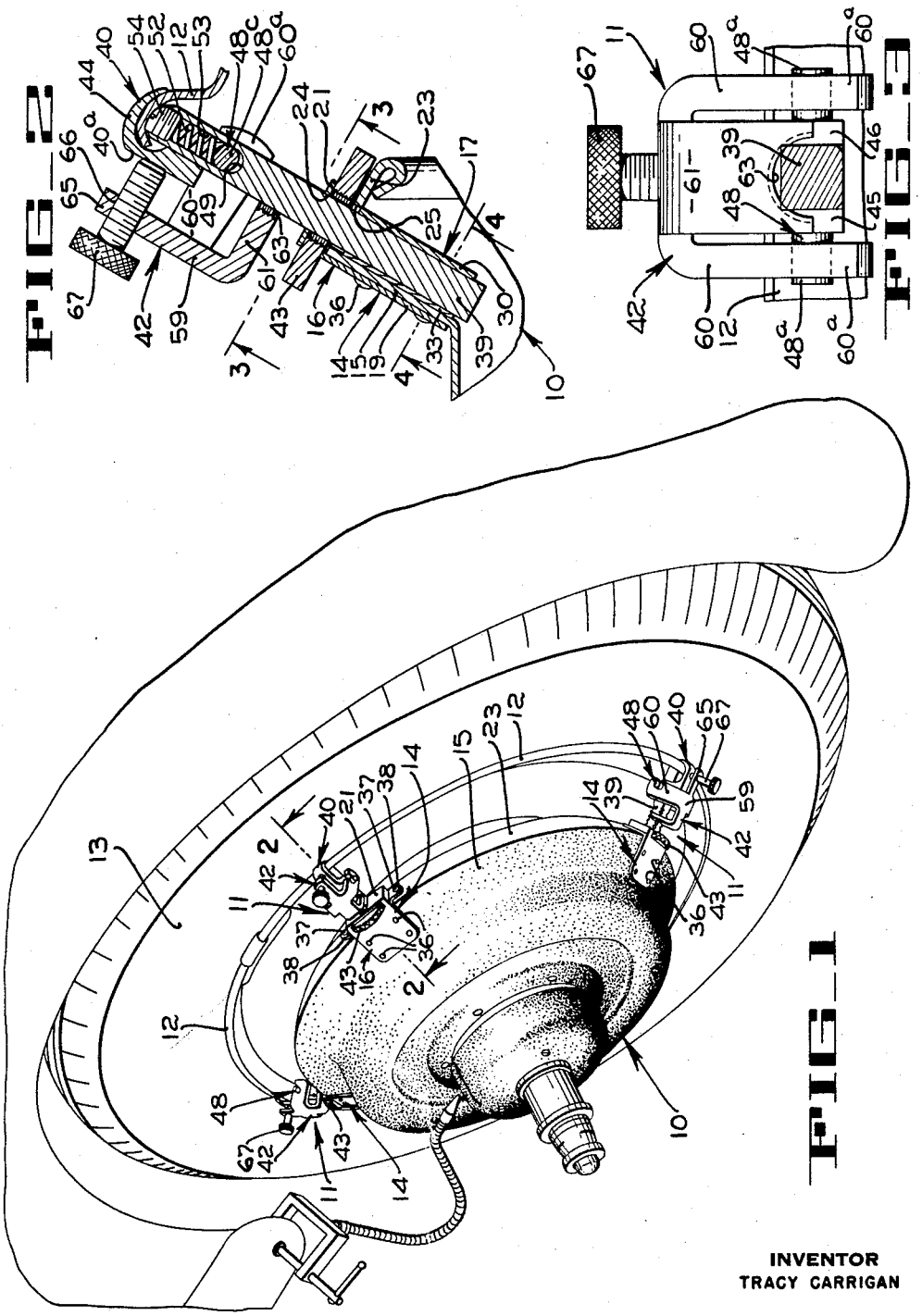
INVENTOR
TRACY CARRIGAN
BY *Hans G. Hoffmeister*
ATTORNEY

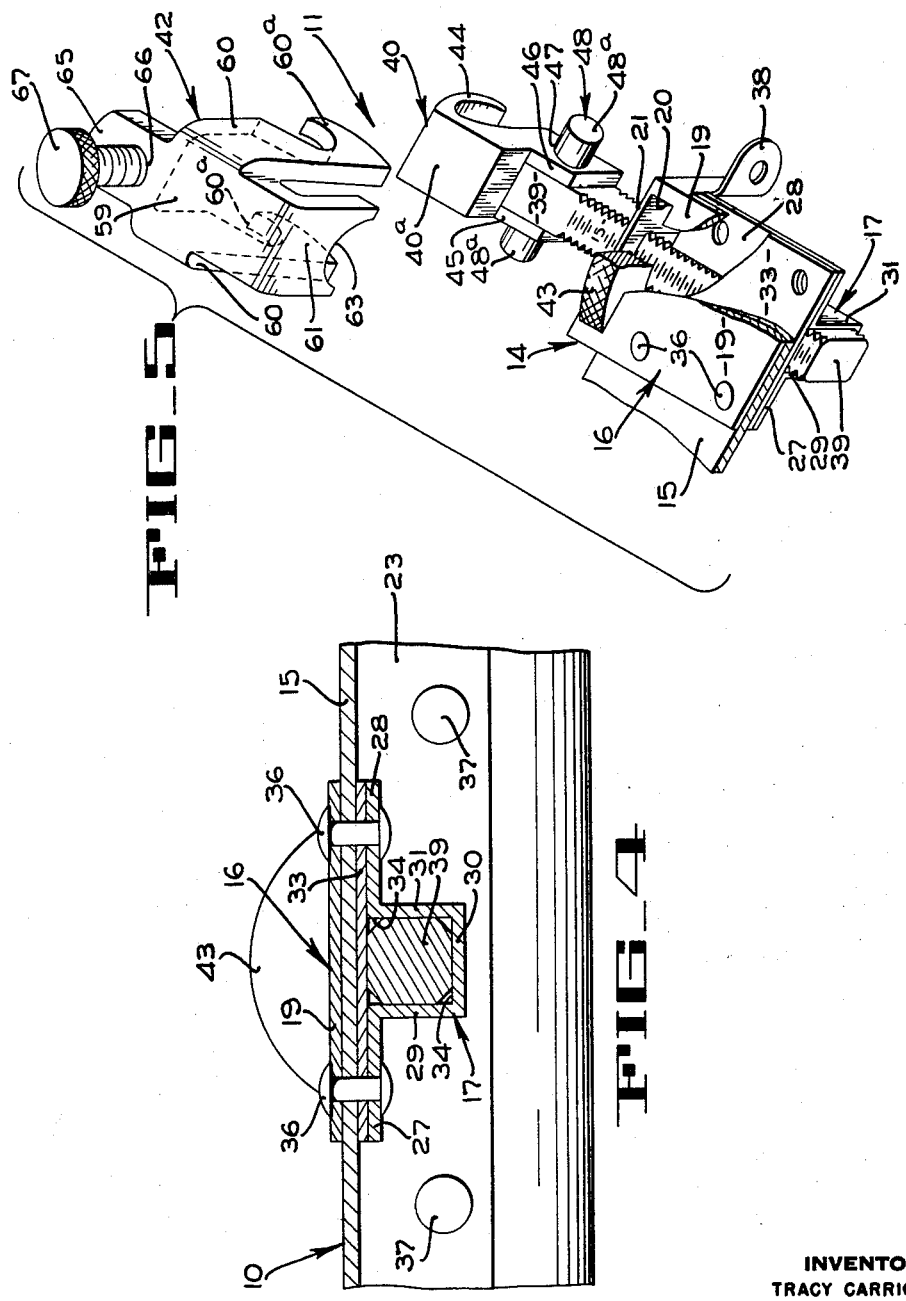

United States Patent Office 2,927,760
Patented Mar. 8, 1960

2,927,760

CLAMP FOR MOUNTING WHEEL BALANCERS

Tracy Carrigan, Lansing, Mich., assignor to Food Machinery and Chemical Corporation, San Jose, Calif., a corporation of Delaware Application May 18, 1956, Serial No. 585,837

6 Claims. (Cl. 248—226)

This invention appertains to improvements in mechanical connectors and more particularly relates to an improved apparatus for clamping and centering test equipment on a rotatable body.

At present automobile wheels are balanced, while they are mounted on the automobile, by means of an instrument that is clamped to the wheel. It has been found that, when the wheel is rapidly rotated, the clamping mechanisms become loosened due to high speed and vibration and, as a result, accurate tests cannot be made.

An object of the present invention is to provide an improved adjustable clamp for holding an instrument on a rotatable body.

Another object is to provide efficient means for locking a clamp in clamping engagement with an object.

Other and further objects and advantages of the present invention will become apparent from the following description taken in connection with the accompanying drawings in which:

Fig. 1 is a fragmentary perspective of an automobile wheel on which a wheel balancing device is mounted and centered by clamps constructed and arranged in accordance with the teachings of the present invention.

Fig. 2 is a section taken along line 2—2 of Fig. 1.

Fig. 3 is a section taken along line 3—3 of Fig. 2.

Fig. 4 is a section taken along line 4—4 of Fig. 2.

Fig. 5 is an exploded view of the clamp shown in Fig. 2, certain parts being broken away.

The clamp of the present invention has general utility in securing test instruments in centered position on rotatable bodies. However, this clamp is specially adapted for mounting wheel balance test apparatus on automobile wheels, and, accordingly, such an installation has been illustrated and described as a preferred embodiment of the invention.

In Fig. 1 the reference numeral 10 indicates a wheel balancer which is secured to the rim 12 of an automobile wheel 13 by four adjustable clamps 11 (three only being visible). A wheel balancer of the type shown in Fig. 1 has a uniform distribution of mass about its axis of rotation and, for accurate operation, it is necessary that the instrument be securely held on the rim of the wheel during operation and that the balancer be accurately centered about the axis of rotation of the wheel. A test instrument having these characteristics is described fully in the application of Bruce Howard Kellogg, Serial No. 394,786, filed November 27, 1953, now Patent No. 2,780,939.

Each clamp 11 extends between the rim 12 and a connector 14 on the casing 15 of the balancer, along an imaginary line radiating from the center of the balancer. The connector 14 comprises a mounting bracket 16 (Fig. 5) secured to one face of the balancer casing 15 and a guide bracket 17 secured to the other face of the casing. The mounting bracket 16 has a square body portion 19 which lies flat against the casing and which is provided with an elongated rectangular aperture 20 at a point radially outwardly of the peripheral edge of the casing. A flange 21 (Figs. 1 and 2) is formed on the outer end of the mounting bracket 16 projecting at a right angle away from the body portion 19 in a direction generally parallel to an inturned lip 23 (Fig. 2) of the balancer casing. An aperture 24 is provided in the flange 21 in line with an aperture 25 in the lip 23. The guide bracket 17 (Fig. 4) has laterally extending flanges 27 and 28 and three wall portions 29, 30 and 31 which cooperate with a flat plate 33 to define an elongated guide passageway 34 that is square in cross-section and is in alignment with the apertures 24 and 25.

The guide bracket 17 and the mounting bracket 16 are secured to the casing 15 by rivets 36 (Fig. 4) which extend through the guide bracket flanges 27 and 28, the flat plate 33, the casing 15, and the body portion 19 of the mounting bracket 16. The mounting bracket 16 is additionally held on the casing 15 by rivets 37 (Fig. 1) which secure laterally extending tabs 38 (Fig. 5) integrally formed on the bracket flange 21, to the casing lip 23.

Each clamp 11 comprises an adjusting rod or bolt 39, a hook 40 pivotally mounted on the outer end portion of the adjusting rod 39, and a hook retainer 42. The adjusting rod 39 is square in transverse cross-section and has a screw thread formed on its outer longitudinal edges. The rod 39 is disposed in sliding, guided engagement in the elongated passageway 34 of the connector 14 and passes through the aperture 25 in the lip of the balancer casing 15 and through the aperture 24 in the flange 21 of the mounting bracket 16. The adjusting rod 39 is moved in and out of the guide passageway 34 by rotating a nut 43 (Fig. 5) that extends through the opening 20 in the mounting bracket 16 and is threaded on the rod 39. To prevent linear movement of the nut 43 as it is threaded on the rod 39, the nut is disposed between the casing lip 23 and the flange 21 of the mounting bracket 16.

The hook 40 of the clamp has an outer end 44 with a concavely curved inner surface conforming to the contour of the rim surface which it engages. The shank of the hook 40 is provided with two spaced parallel ears 45 and 46 (Fig. 5) with an opening 47 in one ear aligned with an identical opening (not shown) in the other ear. The hook 40 is pivotally mounted near the outer end of the adjusting rod 39 by means of a pin 48 that is secured, as by a press fit, in the openings 47 in the ears 45 and 46. The pin 48 has outer end portions 48a that project a short distance outwardly from the ears 45 and 46, and has a central portion 48c (Fig. 2) that extends through an opening 49 that extends transversely through the adjusting rod 39. The transverse opening 49 is elongated or oval-shaped in a direction longitudinally of the rod 39, so that the pin 48 may shift slightly in said longitudinal direction. A spring 52 is disposed in a longitudinally extending opening 53 in the end of the rod 39 between the pin 48 and a closure plug 54 threaded in the end of the opening 53. In this position the spring is effective to urge the pin 48 toward the rearward wall of the transverse opening 49 whereby to resiliently urge the hook 40 into clamping engagement with the rim 12 of the wheel. The outer end of the adjusting rod 39 and the closure plug 54 are curved to conform to the curvature of the rim surface with which they are in contact.

The retainer 42 is in the form of a lever and has a central body portion 59 and a pair of spaced, side arms 60 (Figs. 3 and 5) projecting from the body portion. Each side arm 60 has a hooked end portion 60a arranged to pivotally receive the projecting end portions 48a of the pin 48, as seen in Figs. 2 and 3. A rear arm member 61 of the retainer 42 projects away from the body portion 59 toward the adjusting rod 39, and is provided with indentations or serrations such as teeth 63 (Fig 2). The lower end of the arm 61 is semi-circular in configuration (Fig. 3) so that the teeth 63 enter the thread segments formed on two of the corners of the adjusting rod. The retainer 42 also has an outwardly projecting tab 65 (Fig. 5) which is provided with a tapped opening 66 adapted to receive an adjusting screw 67.

After the hook 40 has been resiliently clamped on the rim 12 and the retainer placed over the hook, the adjusting screw 67 is threaded into the opening 66 to bring the end of the screw into engagement with the surface 40a of the hook. After the end of the screw engages the hook, continued rotation of the screw causes the retainer to pivot counterclockwise (Fig. 2) about the axis of the pin 48 to force the teeth 63 on the semi-circular end of the retainer arm 61 to be firmly seated in the threads formed on the adjusting rod 39.

With this arrangement, the hook retainer 42 positively prevents the hook 40 from pivoting away from the rim 12, as the balancer is rapidly rotated and vibrated during the wheel balancing operation. Thus, the instrument not only is positively held on the wheel but its centered position thereon is not disturbed. The engagement of the threads 63 with the threads of the rod 39 prevents the retainer 42 from slipping along the rod after it has been locked in place.

It will be understood that modifications and variations of the embodiment of the invention disclosed herein may be made without departing from the novel concepts of the present invention. Therefore, the scope of the invention should be limited only by the scope and proper interpretation of the claims appended hereto.

Having thus described my invention, what I claim as new and desire to protect by Letters Patent is:

1. A clamp comprising a rod having an end portion adapted to engage one surface of an object to be clamped, a hook pivotally mounted on said rod and having a portion arranged to be moved into engagement with a surface of the object opposite to the surface engaged by said rod and having an abutment surface adapted to bear against a side surface of said rod when said rod and hook are in engagement with an object, and a retaining lever pivotally mounted on said rod and having a pressure member disposed in pressure-applying engagement with a surface of said hook opposite said abutment surface for applying pressure thereto in a direction to clamp the abutment surface of said hook into abutting engagement with said rod when said hook and rod are in engagement with an object, whereby the friction between said abutment surface and said rod resists movement of said hook longitudinally relative to said rod.

2. A clamp comprising a rod having an end portion adapted to abut one surface of an object to be clamped, pivot members projecting laterally from opposite sides of said rod, a hook pivotally mounted on said members and having a portion arranged to engage a surface of the object opposite to the surface engaged by said rod, a retainer lever pivotally mounted on said pivot members, a gripping arm on said lever arranged to grip said rod at a point spaced longitudinally on said rod from said pivot members, and an adjustable pressure member on said lever disposed in pressure-applying engagement with said hook at a point on the opposite side of said pivot members from said gripping arm when said hook and rod are in engagement with an object, said pressure being exerted in a direction to retain said hook in engagement with said object.

3. A clamp comprising a threaded rod having an end portion adapted to abut one surface of an object to be clamped, pivot members projecting laterally from opposite sides of said rod, a hook pivotally mounted on said pivot members and having a portion arranged to engage a surface of the object opposite to the surface engaged by said rod, and a retainer operatively connected between said hook and said rod and including a pair of arms having hooked end portions detachably and pivotally associated with said pivot members, a gripping arm having indentations arranged to engage in the teeth of said rod, an apertured pressure arm, and a screw threaded through the aperture in said pressure arm and arranged to contact said hook and press it into engagement with a side of said rod to retain said hook and rod in engagement with an object.

4. A clamp comprising a rod having an end portion adapted to abut one surface of an object to be clamped, a hook pivoted on said rod and having a portion arranged to engage a surface of the object opposite to the surface engaged by said rod, and a lever pivoted at a predetermined point on said rod and including a gripping arm in engagement with the rod on one side of the pivot point and an adjustable pressure member disposed in pressure-applying engagement with said hook on the other side of the pivot point, said pressure being exerted in a direction to retain said hook in engagement with said object.

5. A clamp comprising a threaded rod having an end portion adapted to abut one surface of an object to be clamped, a hook pivoted on said rod and having a portion arranged to engage a surface of the object opposite to the surface engaged by said rod, a lever pivoted on said rod and including a gripping arm of arcuate configuration having serrations formed on its end portion and adapted to engage the threads of said rod at a point spaced longitudinally of said rod from said pivotal connection, and means operatively connected between said lever and said rod at a point on the opposite side of said pivotal connection for urging said lever to pivot about said pivotal connection and press said serrations into engagement with the threads on said rod when said hook and rod are in engagement with an object.

6. A clamp comprising a threaded rod having an end portion adapted to abut one surface of an object to be clamped, pivot members projecting laterally from opposite sides of said rod, a hook pivotally mounted on said pivot member and having a portion arranged to engage a surface of the object opposite to the surface engaged by said rod, and a retainer mounted for pivoting movement on said rod and having a gripping arm having indentations arranged to engage in the teeth of said rod, an apertured pressure arm, and a screw threaded through the aperture in said pressure arm and disposed in pressure-applying contact with said hook for pressing said hook into engagement with a side of said rod to retain said hook and rod in engagement with an object.

References Cited in the file of this patent

UNITED STATES PATENTS

| | | |
|---|---|---|
| 849,517 | Wanamaker et al. | Apr. 9, 1907 |
| 1,349,225 | Rosenblum | Aug. 10, 1920 |
| 2,081,797 | Figlia | May 25, 1937 |
| 2,692,150 | Maier | Oct. 19 1954 |
| 2,780,939 | Kellogg | Feb. 12, 1957 |